United States Patent
Albrow et al.

[11] Patent Number: 6,044,086
[45] Date of Patent: Mar. 28, 2000

[54] CONTROL SIGNAL TRANSMISSION IN DIGITAL RADIO TELEPHONY

[75] Inventors: Richard John Albrow, Hadstock; Simon Alexander Black, Whittlesford; Leigh Carter, Haslingfield; Rupert Leslie Alexander Goodings, Cambridge; Paul Maxwell Martin, Newmarket; Neil Philip Piercy, Herts, all of United Kingdom

[73] Assignee: Ionica International Limited, Cambridge, United Kingdom

[21] Appl. No.: 08/809,122

[22] PCT Filed: Sep. 8, 1995

[86] PCT No.: PCT/GB95/02136

§ 371 Date: Jun. 30, 1997

§ 102(e) Date: Jun. 30, 1997

[87] PCT Pub. No.: WO96/08893

PCT Pub. Date: Mar. 21, 1996

[30] Foreign Application Priority Data

Sep. 16, 1994 [GB] United Kingdom ............... 9418750

[51] Int. Cl.⁷ ................. H04J 3/12; H04B 7/26
[52] U.S. Cl. ............ 370/458; 370/336; 370/345; 455/458

[58] Field of Search ............... 370/321, 328, 370/336, 337, 345, 347, 458; 455/38.1, 458

[56] References Cited

U.S. PATENT DOCUMENTS

| | | | |
|---|---|---|---|
| 4,352,955 | 10/1982 | Kai et al. | 455/38.1 |
| 5,210,751 | 5/1993 | Onoe et al. | 370/337 |
| 5,404,355 | 4/1995 | Raith | 455/38.1 |
| 5,440,545 | 8/1995 | Buchholz et al. | 370/337 |
| 5,502,721 | 3/1996 | Pohjakallio | 370/336 |
| 5,559,804 | 9/1996 | Amada et al. | 370/349 |
| 5,603,081 | 2/1997 | Raith et al. | 370/345 |

OTHER PUBLICATIONS

Seizo Onoe et al, "Radio Link Control Techniques for Digital Cellular Systems", pp. 47–54, NTT Review, vol., 4, No. 1, Jan. 1992.
Copy of the International Search Report.

*Primary Examiner*—Chi H. Pham
*Assistant Examiner*—Frank Duong
*Attorney, Agent, or Firm*—Fish & Richardson P.C.

[57] ABSTRACT

In transmission between a base station and a subscriber unit, system control signals are sent in time slots within fixed length time frames. The system control signals are fragmented, each fragment being sent in a different time slot of a frame.

18 Claims, 3 Drawing Sheets

BROADCAST FRAGMENTATION

BROADCAST FRAGMENTATION

CONTROL SIGNAL TRANSMISSION IN DIGITAL RADIO TELEPHONY

This is a continuation of PCT Application No. PCT/GB95/02136, filed Sep. 8, 1995.

This invention relates to transmission of system control signals in time slots within fixed length time frames.

In Time division multiplex/time division multiple access (TDM/TDMA) systems, system control signals are broadcast from a base station to associated subscriber units. These system control signals can be paging messages addressed to a specific subscriber unit. They could be messages allocating traffic channels in response to a request from a subscriber unit to set up a call. The system control signals could include user-specific messages, addressed and sent to a specific subscriber unit despite no traffic channel having been allocated. The system control messages can include a list (Aloha slot list) of channels available to subscriber units for transmission of call set-up requests.

In conventional TDM/TDMA systems such as GSM (Global System for Mobile communications") systems, system control signals are sent over a dedicated channel, i.e. one slot in each TDM frame from the base station to the subscriber unit is dedicated for such signalling. This is known as a Broadcast channel.

The present invention is defined in the claims to which reference should now be made.

The present invention preferably provides a method of transmission of system control signals between a base station and subscriber units in a TDM/TDMA system, control signals comprising data units, in which each data unit is fragmented, each fragment being sent in a different time slot of a frame. Transmission is preferably from a base station to subscriber units.

The present invention also relates to a method of reception of control signals from a base station at a subscriber unit in a TDM\TDMA system, in which control signal data fragments are received at a subscriber unit over time for recombination to provide control signals, each fragment having been sent in a different time slot of a TDM frame.

The present invention also relates to a base station including control signal fragmentation means operative to fragment control signals into predetermined portions of different TDM time slots for transmission, and transmission means. The present invention further preferably provides a subscriber unit including reception means operative to receive signals from a base station, selection means operative to distinguish system control signal fragments, and recombination means operative to recombine said fragments to provide system control signals at said subscriber unit.

The present invention has the advantage of avoiding the need for a dedicated broadcast channel.

Preferably, the system control fragments are of predetermined length and take a predetermined position within each slot. The fragments can be of equal fixed length. Each slot can also include other data such as speech data. A TDM frame, preferably of ten slots, preferably includes a fragment in each slot. Accordingly, system control signals which are coded into standard length data units, are fragmented such that each data unit provides ten equal length fragments. Each data unit can include a header and error correction data in addition to system control signalling. The error correction data can be cyclic redundancy check data (CRC).

The correct transmission of system control signals is preferably further protected by forward error correction (FEC) in the TDM frame.

The system control data units are preferably replicated on all of the radio frequency carriers transmitted from a base station; and the transmission of TDM frames on all these radio frequency carriers are synchronised. Accordingly, a subscriber unit can correctly receive system control signalling irrespective of which RF carrier is received.

A preferred embodiment of the present invention will now be described, by way of example, with reference to the drawings in which.

THE BASIC SYSTEM

Figure 1:
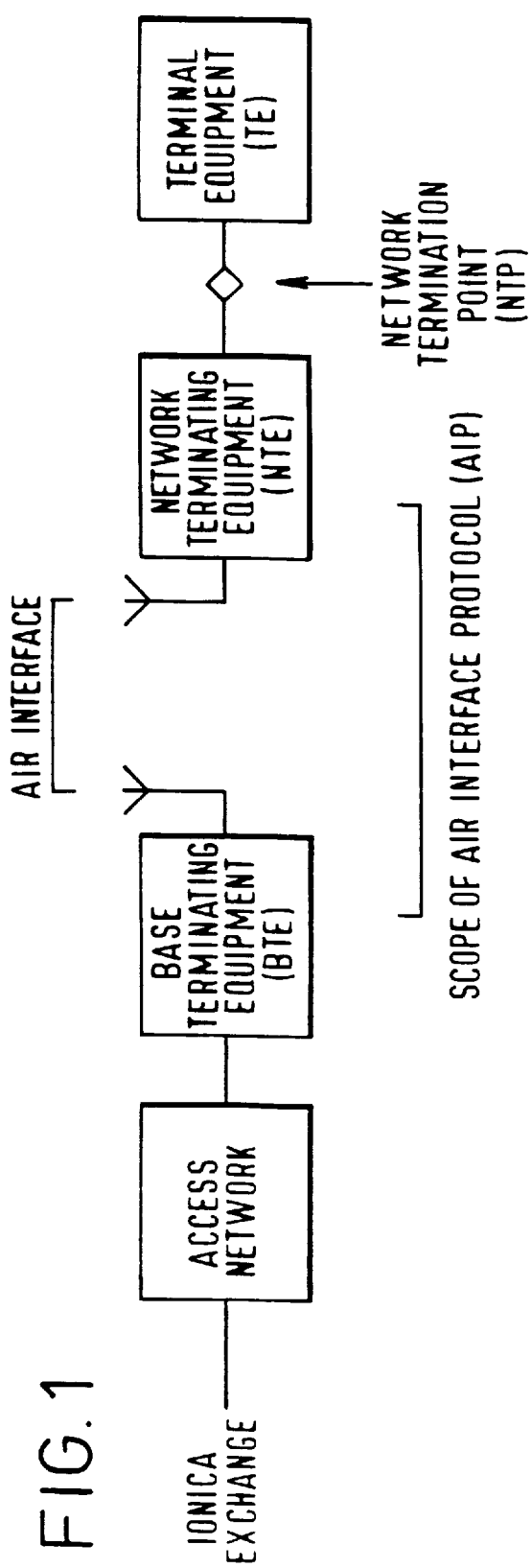
FIG. 1 is a schematic diagram illustrating the system including a base station (BTE—Base Terminating Equipment) and subscriber unit (NTE—Network Terminating Equipment)

As shown in FIG. 1, the preferred system is part of a telephone system in which the local wired loop from exchange to subscriber has been replaced by a full duplex radio link between a fixed base station and fixed subscriber unit. The preferred system includes the duplex radio link, and transmitters and receivers for implementing the necessary protocol. There are similarities between the preferred system and digital cellular mobile telephone systems such as GSM which are known in the art. This system uses a protocol based on a layered model, in particular, the following layers: PHY (Physical), MAC (Medium Access Control), DLC (Data Link Control), NWK (Network).

One difference compared with GSM is that, in the preferred system, subscriber units are at fixed locations and there is no need for hand-off arrangements or other features relating to mobility. This means, for example, in the preferred system directional antennae and mains electricity can be used.

Figure 2:
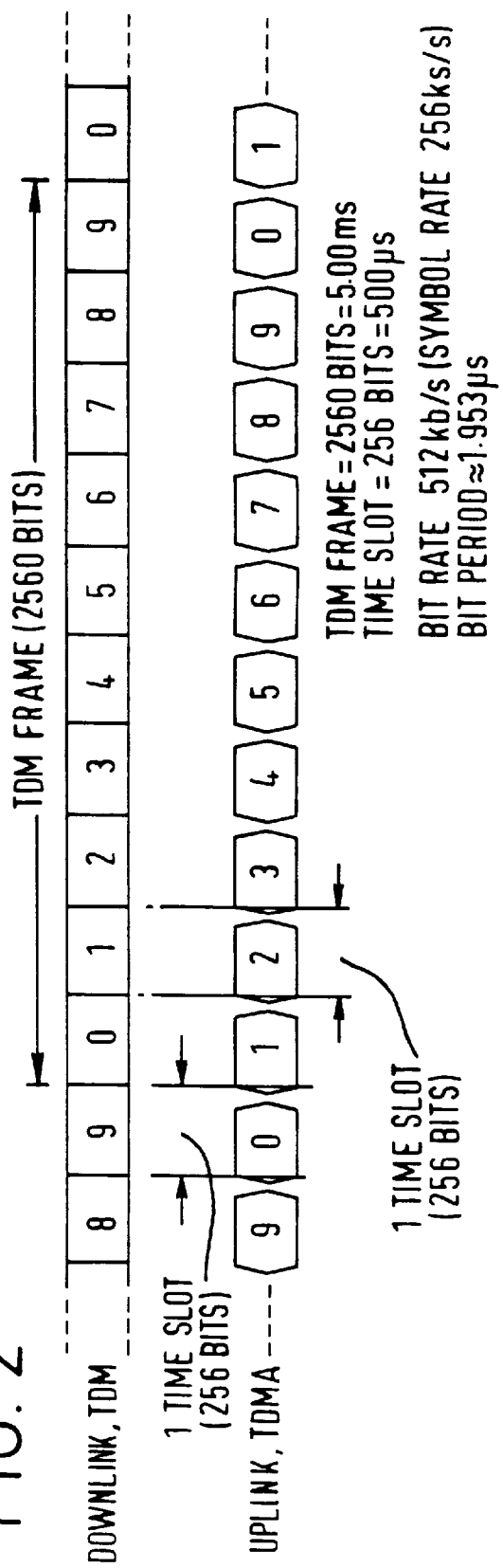
FIG. 2 is a diagram illustrating frame structure and timing for a duplex link.

Each base station in the preferred system provides six duplex radio links at twelve frequencies chosen from the overall frequency allocation, so as to minimize interference between base stations nearby. The frame structure and timing for the duplex link is illustrated in FIG. 2. Each duplex radio link comprises an up-link from a subscriber unit to a base station and, at a fixed frequency offset, a down-link from the base station to the subscriber unit. The down-links are TDM, and the up-links are TDMA. Modulation for all links is π/4-DQPSK, and the basic frame structure for all links is ten slots per frame of 2560 bits, i.e. 256 bits per slot. The bit rate is 512 kbps. Down-links are continuously transmitted and incorporate a broadcast channel for essential system information. When there is no user information to be transmitted the downlink transmissions continue to use the basic frame and slot structure and contain a suitable fill pattern.

For both up-link and down-link transmissions, there are two types of slot, normal slots which are used after call set-up, and pilot slots used during call set-up.

Each down-link normal slot comprises 8 bits of synchronisation information followed by 24 bits designated S-field which includes an 8 bit header, followed by 160 bits designated D-field. This is followed by 24 bits of Forward Error Correction and an 8 bit tail, followed by 12 bits of broadcast channel. The ten broadcast channel segments in each of the slots of a frame together form the down-link common signalling channel which is transmitted by the base station, and contains control messages containing link information such as slot lists, multi-frame and super-frame information, connectionless messages, and other information basic to the operation of the system.

During call setup, each down-link pilot slot contains frequency correction data and a training sequence for receiver initialisation with only a short S-field and no D-field information.

Up-link slots basically contain two different types of data packet. The first type of packet, called a pilot packet, is used before a connection is set up, for example, for an Aloha call request and to allow adaptive time alignment. The other type of data packet, called a normal packet, is used when a call has been established and is a larger data packet, due to the use of adaptive time alignment.

Each up-link normal packet contains a data packet of 244 bits which is preceded and followed by a ramp of 4 bits duration. The ramps and the remaining bits left of the 256 bit slot provide a guard gap against interference from neighbouring slots due to timing errors. Each subscriber unit adjusts the timing of its slot transmission to compensate for the time it takes signals to reach the base station. Each up-link normal data packet comprises 24 bits of synchronisation data followed by an S-field and D-field of the same number of bits as in each down-link normal slot.

Each up-link pilot slot, contains a pilot data packet which is 192 bits long preceded and followed by 4 bit ramps defining an extended guard gap of 60 bits. This larger guard gap is necessary because there is no timing information available and without it propagation delays would cause neighbouring slots to interfere. The pilot packet comprises 64 bits of sync followed by 104 bits of S-field which starts with an 8 bit header and finishes with a 16 bit Cyclic Redundancy Check, 2 reserved bits, 14 FEC bits, and 8 tail bits. There is no D-field.

The S-fields in the above mentioned data packets can be used for two types of signalling. The first type is MAC signalling (MS) and is used for signalling between the MAC layer of the base station and the MAC layer of a subscriber unit whereby timing is of importance. The second type is called associated signalling, which can be slow or fast and is used for signalling between the base station and subscriber units in the DLC or NWK layers.

The D-field is the largest data field, and in the case of normal telephony contains digitised speech samples, but can also contain non-speech data samples.

Provision is made in the preferred system for subscriber unit authentication using a challenge response protocol. General encryption is provided by combining the speech or data with a non-predictable sequence of cipher bits produced by a key stream generator which is synchronised to the transmitted super-frame number.

In addition, the transmitted signal is scrambled to remove dc components.

DISTRIBUTED SYSTEM CONTROL SIGNALLING

Figure 3:
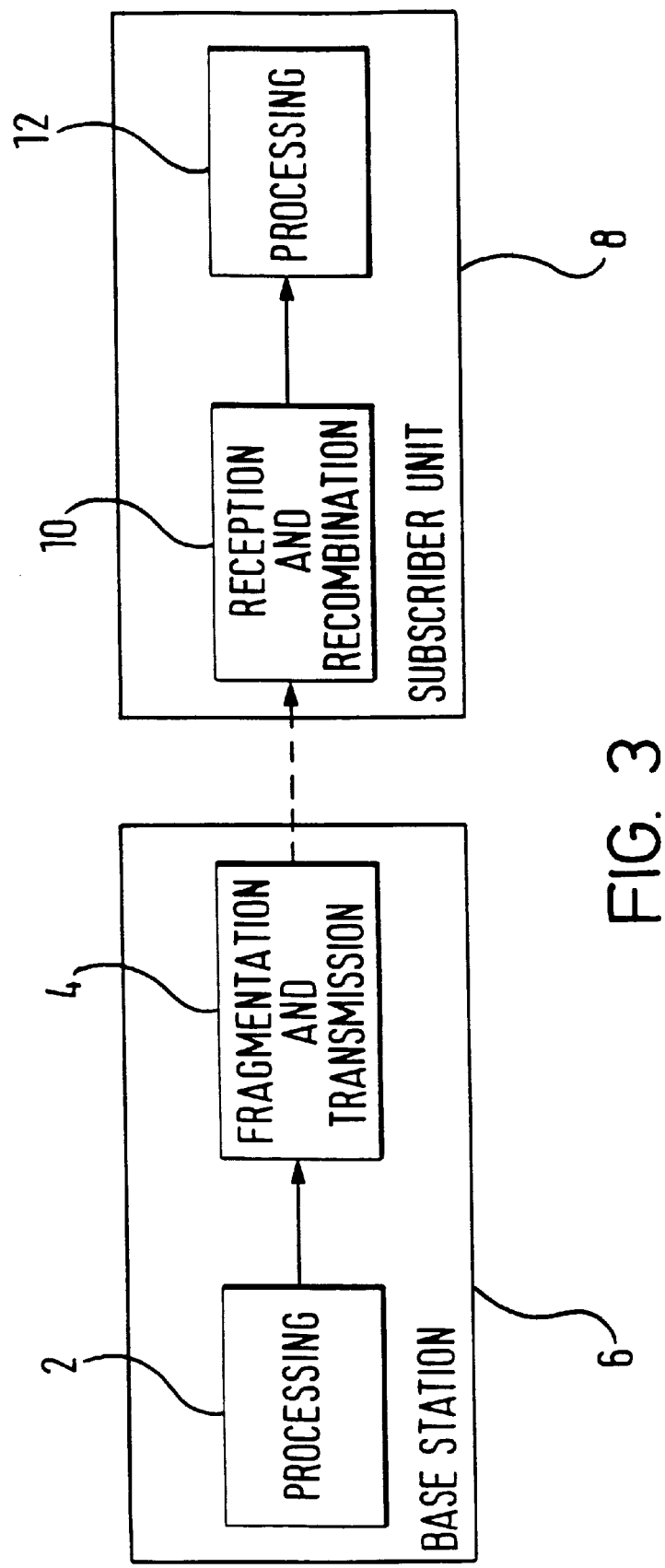
FIG. 3 is a block diagram illustrative of the basic hardware for communication of control signals.
Figure 4:
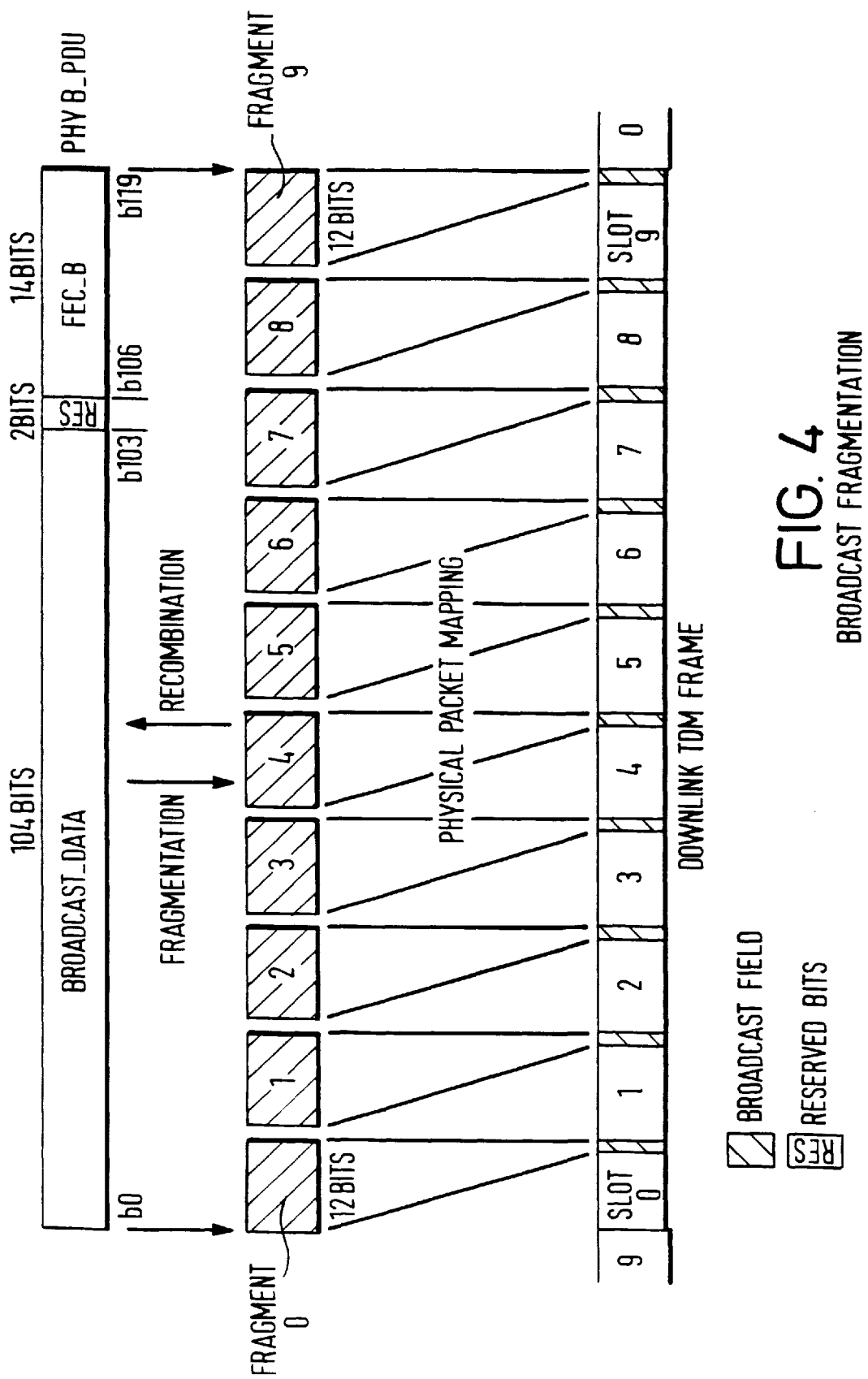
FIG. 4 is a diagram illustrating fragmentation of control signals (BROADCAST DATA) in a control signalling data unit (PDU) for transmission in predetermined portions of slots within a downlink TDM frame, and subsequent recombination.

System control signalling, i.e. broadcast signalling, is transmitted down-link as shown in FIGS. 3 and 4. The control data is fragmented such that each part of the broadcast signal takes up a predetermined part of a respective slot within a down-link TDM frame. There are processing means 2 and fragmentation/transmission means 4 at the base station 6. At each of the plurality of subscriber units 8, there are corresponding reception/recombination means 10 and processing means 12. In operation, the control signals are fragmented for transmission and recombined after reception at a subscriber unit.

At the base station, as shown in FIG. 4, system control signalling is first coded into so-called service data units consisting of 104 bits broadcast data. Forward error correction data (FEC-B) is added together with 2 bits which are held in reserve to provide a standard length data unit of 120 bits. As shown in FIG. 4, the data unit is fragmented into ten 12 bit fragments. The first fragment is sent in the broadcast field of the down-link physical packet in time slot zero of the TDM frame, the second in slot 1, and so on, until the last fragment of that data unit is sent in the physical packet transmitted in time slot 9. Thus, it will be seen that the broadcast field is a predetermined portion of each down-link physical packet, one down-link physical packet being transmitted in one time slot. Accordingly, a single data unit is sent in each complete TDM frame.

At the subscriber unit, the 12 bit broadcast fields from each of the ten down-link physical packets are received, stored, and recombined to form a complete reconstituted data unit of broadcast signals.

We claim:

1. A method of transmission of system broadcast control signals in time slots within fixed length time frames, comprising:

coding said system broadcast control signals into data units, said system broadcast control signals representative of at least one of:
a paging message addressed to a specific subscriber unit,
a message allocating traffic channels in response to a request from a subscriber unit to set-up a call,
a message addressed and sent to a specific subscriber unit despite no traffic channel being allocated,
a list of channels available to subscriber units, and
a list of time slots available for call set-up requests,
fragmenting each data unit into fragments
sending each fragment in a different time slot of one of the fixed length time frames,
transmitting the fragmented system broadcast control signal from a base station to at least one subscriber unit, wherein the data units are transmitted on all of the plurality of radio frequency carrier signals transmitted from the base station and the transmission of frames on all the radio frequency carriers are synchronized so as to enable the at least one subscriber unit to correctly receive system control signalling from any of radio frequency carriers received.

2. A method according to claim 1, wherein transmitting the fragmented system broadcast control signal is by radio.

3. A method according to claim 1, in which the frame comprises one fragment per time slot.

4. A method of transmission of system control signals according to claim 1, in which each subscriber unit is at a fixed location.

5. A method according to claim 1 in which the fragments are of predetermined length and take a predetermined position within each slot.

6. A method according to claim 1 in which the fragments are of equal fixed length.

7. A method according to claim 1 in which each slot also carries other data such as speech data.

8. A method according to claim 1 in which each data unit includes a header and error correction data in addition to system control signalling.

9. A method according to claim 8, in which the error correction data comprises cyclic redundancy check data (CRC).

10. A method according to claim 9, in which the error correction data comprises forward error correction (FEC) data.

11. A method according to claim 1, wherein the system broadcast control signals comprises a paging message addressed to a specific subscriber unit.

12. A method according to claim 1, wherein the system broadcast control signals comprise messages allocating traffic channels in response to a request from a subscriber unit to set up a call.

13. A method according to claim 1, wherein the system broadcast control signals include messages addressed and sent to a specific subscriber unit despite no traffic channel having been allocated.

14. A method according to claim 1, wherein the system broadcast control signals include a list of channels available to subscriber units.

15. A method according to claim 1, wherein the system broadcast control signals include a list of time slots available for call set-up requests.

16. The method according to claim 1, wherein the fragments are transmitted in different time slots of the same time frame.

17. A base station comprising:
control signal fragmentation means operative to fragment system broadcast control signals into predetermined portions of different time slots within fixed length time frames for transmission, and
transmission means operative to transmit the fragment system broadcast control signals, the system control signals comprising at least one of:
a paging message addressed to a specific subscriber unit,
a message allocating traffic channels in response to a request from a subscriber unit to set-up a call,
a message addressed and sent to a specific subscriber unit despite not traffic channel being allocated,
a list of channels available to subscriber units, and
a list of time slots available for call set-up request.

18. The base station according to claim 17, wherein the transmission means transmits the fragment system control signals in different time slots of the same time frame.

* * * * *